United States Patent Office 2,811,494
Patented Oct. 29, 1957

2,811,494

AMPHOLYTIC, HYDROPHILIC, POLYMERIC SOLUTIONS AND MIXTURES THEREOF WITH GELATIN

Donald A. Smith and William F. Fowler, Jr., Rochester, N. Y., assignors to Eastman Kodak Company, Rochester, N. Y., a corporation of New Jersey No Drawing. Application February 5, 1954,
Serial No. 408,573

7 Claims. (Cl. 260—8)

This invention relates to certain polymeric solutions which are ampholytic in character and which are compatible with gelatin over a wide range of proportions.

Proteinaceous hydrophilic colloids have come into widespread use in the preparation of photographic emulsions and similar uses where the gel-forming properties of such colloidal materials, gelatin is the most widely used because of its excellent gel-forming ability. The use of gelatin or other naturally occurring colloidal materials offers certain disadvantages, however, because of the nonuniformity of such materials and their tendency to deteriorate upon storage. Attempts have been made to prepare synthetic gelatin substitutes for either partial or complete replacement of the naturally occurring gelatin in photographic emulsions. It has been difficult heretofore to prepare polymeric materials which have the gel-forming and hydrophilic characteristics to the same degree as does gelatin. Furthermore it has been difficult to prepare synthetic materials which are stable over the pH range encountered in the preparation of photographic emulsions. Although a number of polymeric materials have been used as additives for gelatin, they are usually limited in being only partially compatible with the gelatin. As a consequence, mixtures of gelatin and such synthetically prepared materials usually include a minor amount of the polymeric material in admixture with a major amount of gelatin. The use of higher amounts of the polymers prepared heretofore has tended to give mixtures which were hazy or which gave reticulated films upon evaporation of the emulsion. Furthermore, changes in the pH of the mixture often led to separation of the polymers from the emulsion or the presence of coagulum which gave the film a cloudy appearance. It is therefore desirable to provide pH-stable compatible polymeric compositions which can be used as either partial or complete replacements for gelatin, and which can be used in the preparation of photographic films and papers and in any of the various layers such as the silver halide emulsion layer, filter layer, subbing layer, or the like.

It is accordingly an object of this invention to provide new and improved polymeric materials for use as partial or complete gelatin replacements. Another object of the invention is to provide polymeric solutions which are hydrophilic in character, and which are stable over the entire pH range ordinarily encountered in the manufacture and processing of photographic emulsions. Another object of the invention is to provide polymeric solutions which are compatible with gelatin to a much higher degree than was possible heretofore. Another object of the invention is to provide new and improved compositions of matter comprising mixtures of gelatin and a polymeric aqueous solution prepared in water. Another object of the invention is to provide improved polymer compositions which combine the characteristics of stability over a wide pH range and compatibility with gelatin in widely varying proportions. Another object of the invention is to prepare ampholytic hydrophilic polymeric compositions by the copolymerization of four different monomeric materials characterized by monoethylenic unsaturation. Other objects will be apparent from the description and claims which follow.

These and other objects are attained by means of this invention, which comprises solution copolymerizing an acrylamide, acrylonitrile, an acrylic acid, and an N,N-dialkyl amino acrylate to obtain a polymeric solution in which the polymer contains at least 5 percent by weight of each of these monomers combined into a single polymer. We have found that polymeric solutions as defined herein and containing four components are characterized by being both hydrophilic and ampholytic. As a consequence, these solutions are extremely stable against changes in pH and at the same time possess a high degree of compatibility with gelatin or similar well known proteinaceous hydrophilic colloids. Unlike the polymers which have been employed heretofore, the polymeric solutions prepared in accordance with this invention can be used in admixture with gelatin over a wide range of proportions, including mixtures in which the polymeric solutions content equals or predominates over the gelatin content of the mixture. Thus by means of this invention the properties of a gelatin emulsion can be changed to a greater degree than was possible with polymeric hydrosols which had to be employed in minor amounts in order to avoid the formation of cloudy or reticulated films, for the compositions described herein are aqueous solutions.

The polymeric solutions embodying this invention are prepared by the dispersion polymerization of the mixture of monomeric materials, usually in the presence of a polymerization catalyst, and preferably in an aqueous emulsion or solution. Since the copolymers are readily prepared in aqueous solution, they can be used directly for addition to aqueous solutions of gelatin without the necessity of first isolating the polymer therefrom. In some cases, it is desirable, of course, to either dilute or concentrate the polymerization reaction mixture in order to obtain a solution having the desired solids content. Although isolation of the polymer is usually not necessary, the polymer can, of course, be removed from the reaction mixture by the usual methods and then redispersed before use in the preparation of emulsions. In practicing the invention, the monomeric mixture is usually heated at polymerizing temperatures for a period of from 3 to 6 hours, although longer or shorter polymerization times can be employed if desired. The conditions under which the polymer is formed correspond generally to the polymerization conditions ordinarily employed in polymerizing monoethylenic monomers, and these conditions do not, therefore, form a part of this invention unless otherwise specifically indicated. The polymerization is facilitated by the use of a solution polymerization catalyst, a large number of which are well known in the art. Any of these well known catalysts can be employed, and the invention is not limited to the use of any particular material for this purpose. Usually the per-catalysts, such as the persulfates and peroxides, are employed for convenience in accordance with usual polymerziation practices.

The monomers which are polymerized to form the solution consist of a mixture of an acrylic amide, an acrylic acid, acrylonitrile, and an N,N-dialkyl amino acrylate. In practicing the invention, each of these monomers is present in at least 5 percent by weight based on the total weight of the mixture. Any of the acrylic amides can be used, including acrylamide, methacrylamide, N-isopropyl acrylamide, N,N-dimethyl acrylamide, and similar well known acrylic amides. In the preferred embodiment, acrylamide itself is desirably employed. The amount of acrylic amide in the copolymer can be varied over rather wide limits. Preferably, however, the acrylic amide and the acrylonitrile are present in a combined amount of more than 50 percent by weight of the total weight of the monomeric mixture being polymerized. The acrylonitrile is desirably employed in an amount of from about one-tenth to about twice the weight of the acrylic amide. The solutions which have optimum properties from the standpoint of gelatin compatibility and utility in photographic emulsions are those in which the acrylic amide amounts to from about 20 percent to about 60 percent by weight of the total monomer weight. The acrylonitrile appears to function to give a polymer which has a much higher degree of compatibilty with gelatin than was obtainable with the polymeric hydrosols known heretofore. The acrylonitrile can be employed in a relatively wide range of proportions but is preferably present in from about 5 percent by weight to about 40 percent by weight of the total weight of the monomers which are polymerized. Polymeric solutions of ampholytic character but not containing acrylonitrile show excellent stability over a relatively wide pH range but must be used in relatively small amounts in admixture with gelatin in order that the films prepared therefrom be free of cloudiness or reticular characteristics. By the use of the four-component copolymer as defined herein, including a substantial amount of acrylonitrile, the utility of the solutions as an adidtive to gelatin is greatly increased.

An acrylic acid is employed as the acidic component in the polymer embodying this invention. Acrylic acid itself is preferably employed in practicing the invention, although methacrylic acid or similar acrylic acids having a vinylic unsaturation can be used if desired. In the preferred embodiment, the acrylic acid is usually employed in an amount of from about 5 percent to about 20 percent by weight of the monomeric mixture, although higher amounts can be employed in some cases. The fourth component of the monomeric mixture is an N,N-dialkyl amino acrylate. The amino acrylates which are preferably employed are the N,N-dialkyl amino alkyl acrylates wherein each of the alkyl groups contains from 1 to 4 carbon atoms. The amino acrylate is usually employed in an amount of from about 5 percent to about 30 percent by weight based on the total weight of the monomeric mixture. Thus the amino acrylate and the acrylic acid can be varied in their relative proportions from a ratio of about 1:3 to 3:1. For convenience the alkyl groups in the amino acrylate are desirably ethyl groups, although they can be any of the lower alkyl groups of from 1 to 4 carbon atoms such as methyl groups, propyl groups, butyl groups, or mixtures thereof if desired.

The polymeric solutions which are obtained by aqueous polymerization in accordance with this invention can be used directly as carriers for photosensitive materials, or they can be admixed with gelatin in aqueous solution. These polymeric materials exhibit excellent adhesion to gelatin layers and to film base stock such as cellulose acetate sheeting, polyester sheeting, or similar film base materials. Thus the polymeric solutions can be used directly to coat film base stock and act as a subbing layer upon which the photographic emulsion layer can be deposited. The photographic emulsion layer which can be employed in this manner can be either a gelatin layer alone, or a mixture of gelatin with the same or a different polymeric solution. When the solution embodying this invention is mixed with gelatin, the mixing can be effected at any desired pH value, since the solution exhibits unusual stability over the entire pH range of from about 3 to about 7 which is usually encountered in preparing photographic emulsions. The mixtures of gelatin and ampholytic copolymers exhibit the same gelling characteristics as does gelatin itself. These mixtures can be spread on a suitable base and dried down to give a clear film which is hard and resistant to abrasion, but which is readily swelled by water and is readily permeable to salt solutions. Thus if desired the mixtures embodying this invention can be used to form a protective coating on photosensitive sheet material such as photographic films and papers. When such films or papers including a protective layer of this kind are placed in a developer solution, the protective layer allows the developer salts to readily penetrate into the photographic emulsion. Furthermore the optical characteristics of the films formed from a gelatin-copolymer mix do not detract from the desired photographic characteristics of the photosensitive material.

The invention is best described by reference to certain preferred embodiments thereof, as illustrated in the following specific examples. It will be understood, however, that the examples are included for purposes of illustration and are not intended to limit the scope of the invention unless otherwise specifically indicated.

*Example 1*

A mixture of 13.2 g. (0.216 mole) of freshly recrystallized acrylamide, 9.85 g. (0.0575 mole) of N,N-diethylamino ethyl acrylate, 6.2 g. (0.086 mole) of acrylic acid, 260 ml. of distilled water, and 0.50 ml. of 30 percent aqueous hydrogen peroxide were charged into a round-bottom flask equipped with a reflux condenser. This reaction mixture was then heated in a 90° C. bath for one hour, whereupon a clear viscous solution was obtained. This polymerized reaction mixture was then diluted with 290 ml. of distilled water to give a 5 percent solution of copolymer, assuming complete polymerization. A 20 ml. portion of this solution was mixed with 10 ml. of 10 percent photographic gelatin solution but gave an extremely hazy mixture which on coating and drying at room temperature produced a very cloudy film. It is thus apparent that the copolymer obtained by polymerizing only three of the components and omitting the acrylonitrile has relatively poor compatibility with gelatin when employed in an amount such that the copolymer is equal to the weight of the gelatin.

*Example 2*

In contrast to the ampholytic copolymer prepared in Example 1, the solutions embodying this invention show excellent compatibility with gelatin. Thus a mixture of 11.0 g. (0.180 mole) of acrylamide, 5.73 g. (0.108 mole) of acrylonitrile, 4.93 g. (0.029 mole) of N,N-diethylamino ethyl acrylate, and 3.1 g. (0.043 mole) of acrylic acid was mixed with 220 ml. of distilled water and 0.5 ml. of 30 percent aqueous hydrogen peroxide and heated at 90° C. for 1½ hours. The viscosity of the solution had risen only slightly during that time, whereupon an additional 0.5 ml. of hydrogen peroxide solution was added, and an hour later 0.1 g. of potassium persulfate and 0.1 g. of sodium acid sulfite were added. The mixture was heated for an hour following addition of the last catalyst. The resulting polymeric solution was then diluted with distilled water to give a 5 percent solution of copolymer. Twenty ml. of this solution was then mixed with 10 ml. of 10 percent photographic gelatin solution as in Example 1. Unlike the previous example, however, no haze was evident on mixing the two liquids, and a perfectly clear film resulted when the mixed aqueous solutions were dried. Furthermore the gelation of the mixtures appeared to occur with about the same rapidity as on cooling a gelatin solution alone.

*Example 3*

A mixture of 13.2 g. of acrylamide, 3.8 g. of acrylonitrile, 5.1 g. of N,N-diethylamino ethyl acrylate, 3.1 g. of acrylic acid, 225 ml. of distilled water and 0.50 ml. of 30 percent aqueous hydrogen peroxide was heated for 1¾ hours at 90° C. Thereafter 0.5 ml. of additional catalyst solution was added, and the polymerization was allowed to proceed for a total of 5 hours. The polymeric solution thereby obtained was mixed with gelatin as described in the preceding examples. As in the case of Example 2, the polymeric solution was completely compatible with gelatin, and a perfectly clear film was obtained upon evaporation of the water from the mixture.

*Example 4*

A polymerizable mixture containing 15.4 g. of acrylamide, 1.9 g. of acrylonitrile, 5.1 g. of N,N-diethylamino ethyl acrylate, 3.1 g. of acrylic acid, 230 ml. of distilled water, and 0.50 ml. of 30 percent aqueous hydrogen peroxide was heated for 5¼ hours with the addition of 0.5 ml. of catalyst solution after 3¼ hours. The resulting polymeric solution was found to be completely compatible with aqueous solutions of gelatin and gave clear unreticulated films on drying.

*Example 5*

An ampholytic polymer was prepared as in the preceding example by polymerizing a mixture of 6.6 g. of acrylamide, 9.5 g. of acrylonitrile, 5.1 g. of N,N-diethylamino ethyl acrylate, and 3.1 g. of acrylic acid in 220 ml. of distilled water containing 0.5 ml. of 30 percent aqueous hydrogen peroxide. In this case, the copolymer precipitated from the hot reaction mixture. As with the other solutions embodying this invention, however, this polymer was compatible with gelatin and found utility in forming photographic emulsions.

*Example 6*

In Example 1 it was shown that the absence of acrylonitrile gave an ampholytic solution which was not compatible with gelatin in equal proportions. The specific nature of the invention is further illustrated in this example wherein 11.0 g. of acrylamide and 5.7 g. of acrylonitrile were copolymerized by heating at 90° C. in 180 ml. of distilled water containing 0.50 ml. of 30 percent aqueous hydrogen peroxide. After 3 hours heating, 0.50 ml. of additional catalyst solution was added, and after 6 hours heating, a similar amount of catalyst solution was added. After a total reaction time of 7 hours, the mixture was removed from the bath, but it showed a poor viscosity, and on cooling to room temperature the product precipitated from aqueous solution. This copolymer could not be employed in aqueous solution with gelatin.

It can thus be seen that ampholytic copolymers which do not contain acrylonitrile have rather limited use as gelatin extenders because their range of compatibility is somewhat limited, even though the polymer itself is soluble in water. Furthermore copolymers of acrylonitrile with a hydrophilic monomer such as acrylamide do not give polymers which are useful in admixture with gelatin. However, when a four-component copolymer is prepared in accordance with this invention, within a broad range of amide to nitrile ratios, the copolymers are formed readily in an aqueous dispersion to produce clear solutions which are stable on cooling, and which are compatible with gelatin to give mixtures which readily gel, and which dry to produce perfectly clear films. Thus by means of this invention polymeric solutions of unusual characteristics are obtained, and these solutions have a much greater degree of utility in the photographic field than was the case with dispersions known heretofore. In making the polymers embodying this invention, the polymerization can be effected in accordance with well-known polymerization practices employed in making any of the well known hydrophilic polymer compositions. Thus, for example, the polymeric solutions can be prepared either batchwise or in a continuous process, and the polymerization can be effected using any of the well known polymerization adjuncts including activators, catalysts, chain regulators, modifiers, and the like. The polymeric solutions embodying this invention find utility in any of the applications wherein naturally occurring hydrophilic colloids, and particularly gelatin, are presently employed. Thus these solutions can be used in either black-and-white or color film, or in photosensitive papers. The solutions defined by the claims include those which are employed in the original polymerization reaction mixture as well as those which have been isolated from the reaction mixture and which are redispersed before use. The gelatin-polymer mixtures are usually employed, of course, in conjunction with other well known photographic materials, and it will be understood that any of such materials can be incorporated into such mixtures within the scope of this invention.

Thus, although the invention has been described in considerable detail with particular reference to certain preferred embodiments thereof, variations and modifications can be effected within the spirit and scope of the invention as described hereinabove and as defined in the appended claims.

We claim:

1. An ampholytic aqueous polymeric solution resulting from the polymerization in aqueous dispersion of a mixture of monomers comprising from about 20 percent to about 60 percent of an amide from the group consisting of acrylamide, methacrylamide, N-alkyl acrylamide wherein the alkyl group contains 1–4 carbon atoms and N-alkyl methacrylamide wherein the alkyl group contains 1–4 carbon atoms, from about 5 percent to about 40 percent by weight of acrylonitrile, from about 5 percent to about 30 percent by weight of N,N-dialkyl aminoalkyl acrylate wherein each alkyl group contains 1–4 carbon atoms, and from about 5 percent to about 20 percent by weight of an acid from the group consisting of acrylic acid and methacrylic acid, all based on the total weight of said mixture, said acrylonitrile amounting to from about one-tenth to about twice the weight of said amide, the combined weight of said acrylonitrile and said amide being more than 50 percent of the total weight of said mixture.

2. A composition of matter comprising a mixture of gelatin and an aqueous polymeric solution resulting from the polymerization in aqueous dispersion of a mixture of monomers comprising from about 20 percent to about 60 percent of an amide from the group consisting of acrylamide, methacrylamide, N-alkyl acrylamide wherein the alkyl group contains 1–4 carbon atoms and N-alkyl methacrylamide wherein the alkyl group contains 1–4 carbon atoms, from about 5 percent to about 40 percent by weight of acrylonitrile, from about 5 percent to about 30 percent by weight of N,N-dialkyl aminoalkyl acrylate wherein each alkyl group contains 1–4 carbon atoms, and from about 5 percent to about 20 percent by weight of an acid from the group consisting of acrylic acid and methacrylic acid, all based on the total weight of said mixture, said acrylonitrile amounting to from about one-tenth to about twice the weight of said amide, the combined weight of said acrylonitrile and said amide being more than 50 percent of the total weight of said mixture.

3. An ampholytic aqueous polymeric solution resulting from the polymerization in aqueous dispersion of a mixture of monomers comprising from about 20 percent to about 60 percent of acrylamide, from about 5 percent to about 40 percent by weight of acrylonitrile, from about 5 percent to about 30 percent by weight of N,N-dialkyl amino alkyl acrylate wherein each alkyl group contains 1–4 carbon atoms, and from about 5 percent to about 20 percent by weight of acrylic acid, all based on the total weight of said mixture, said acrylonitrile amounting to from about one-tenth to about twice the weight of said acrylamide, the combined weight of said acrylonitrile and said acrylamide being more than 50 percent of the total weight of said mixture.

4. An ampholytic aqueous polymeric solution resulting from the polymerization in aqueous dispersion of a mixture of monomers comprising from about 20 percent to about 60 percent of acrylamide, from about 5 percent to about 40 percent by weight of acrylonitrile, from about 5 percent to about 30 percent by weight of N,N-diethylaminoethylacrylate, and from about 5 percent to about 20 percent by weight of acrylic acid, all based on the total weight of said mixture, said acrylonitrile amounting to from about one-tenth to about twice the weight of said acrylamide.

5. A composition of matter comprising a mixture of gelatin and an aqueous polymeric solution resulting from the polymerization in aqueous dispersion of a mixture of monomers comprising from about 20 percent to about 60 percent of acrylamide, from about 5 percent to about 40 percent by weight of acrylonitrile, from about 5 percent to about 30 percent by weight of N,N-dialkyl amino alkyl acrylate wherein each alkyl group contains 1-4 carbon atoms, and from about 5 percent to about 20 percent by weight of acrylic acid, all based on the total weight of said mixture, said acrylonitrile amounting to from about one-tenth to about twice the weight of said acrylamide, the combined weight of said acrylonitrile and said acrylamide being more than 50 percent of the total weight of said mixture.

6. A composition of matter comprising a mixture of gelatin and an aqueous polymeric solution resultnig from the polymerization in aqueous dispersion of a mixture of monomers comprising acrylamide, acrylic acid, acrylonitrile, and an N,N-dialkyl amino alkyl acrylate, wherein each of the alkyl groups contains from 1 to 4 carbon atoms, each of said monomers amounting to at least 5 percent of the total weight of said mixture, said acrylonitrile amounting to from one-tenth to about twice the weight of said acrylamide, the combined weight of said acrylonitrile and said acrylamide being more than 50 percent of the total weight of said mixture, said acrylic acid being present in an amount of from about one-third to about three times the weight of said N,N-dialkylamino alkyl acrylate.

7. A composition of matter comprising gelatin and an aqueous polymeric solution resulting from the polymerization in aqueous dispersion of a mixture of monomers comprising from about 20 percent to about 60 percent of acrylamide, from about 5 percent to about 40 percent by weight of acrylonitrile, from about 5 percent to about 30 percent by weight of N,N-diethylamino ethylacrylate, and from about 5 percent to about 20 percent by weight of acrylic acid, all based on the total weight of said mixture, said acrylonitrile amounting to from about one-tenth to about twice the weight of said acrylamide.

References Cited in the file of this patent

UNITED STATES PATENTS

| | | |
|---|---|---|
| 2,436,926 | Jacobson | Mar. 2, 1948 |
| 2,476,527 | Barnes et al. | July 19, 1949 |
| 2,592,107 | Azorlosa | Apr. 8, 1952 |
| 2,611,763 | Jones | Sept. 23, 1952 |
| 2,649,438 | Bruson | Aug. 18, 1953 |
| 2,666,044 | Catlin | Jan. 12, 1954 |